United States Patent
Knox et al.

[19]

[11] Patent Number: 5,901,977
[45] Date of Patent: May 11, 1999

[54] APPLIQUE FOR CONCEALING AND RETAINING COVER TEAR SEAM FOR AIR BAG

[75] Inventors: Jonathan Knox, Rochester; John D. Gray, Union, both of N.H.; Robert Booth, Sanford, Me.

[73] Assignee: Textron Automotive Company, Inc., Troy, Mich.

[21] Appl. No.: 08/937,575

[22] Filed: Sep. 25, 1997

[51] Int. Cl.⁶ .................................................. B60R 21/16
[52] U.S. Cl. ........................................ 280/728.3; 280/732
[58] Field of Search ............................ 280/728.1, 728.3, 280/732

[56] References Cited

U.S. PATENT DOCUMENTS

| | | | |
|---|---|---|---|
| 4,767,154 | 8/1988 | Okamoto et al. | 296/218 |
| 4,792,180 | 12/1988 | Jacobsen et al. | 296/210 |
| 4,799,390 | 1/1989 | Kimura | 73/865.6 |
| 5,013,083 | 5/1991 | Yada et al. | 296/213 |
| 5,403,034 | 4/1995 | Gans et al. | 280/728 B |
| 5,487,557 | 1/1996 | Eckhout | 280/728.3 |
| 5,529,336 | 6/1996 | Eckhout | 280/728.3 |
| 5,575,527 | 11/1996 | Pfister | 296/213 |
| 5,590,901 | 1/1997 | MacGregor | 280/728.3 |
| 5,611,564 | 3/1997 | Bauer | 280/728.3 |
| 5,630,613 | 5/1997 | Leonard et al. | 280/732 |

*Primary Examiner*—Eric D. Culbreth
*Attorney, Agent, or Firm*—Reising, Ethington, Learman & McCulloch, PLLC

[57] ABSTRACT

A discrete air bag tear seam is provided in the finishing cover of an interior component of an automotive vehicle. An appliqué installed on the cover has an elongated external decorator head concealing the tear seam. Elongated and laterally spaced retention flanges of the appliqué stabilize and releasably retain the cover at the tear seam. The appliqué is secured to a fixed retainer part of the component and operates by releasing the cover at the tear seam to form an air bag door in response to the forced outward movement of an underlying door substrate on air bag deployment. The underlying door substrate exerts a force on the cover and particularly the outer skin thereof and causes it to pull away from the appliqué starting at the concealed tear seam to establish an opening for improved air bag deployment.

5 Claims, 4 Drawing Sheets

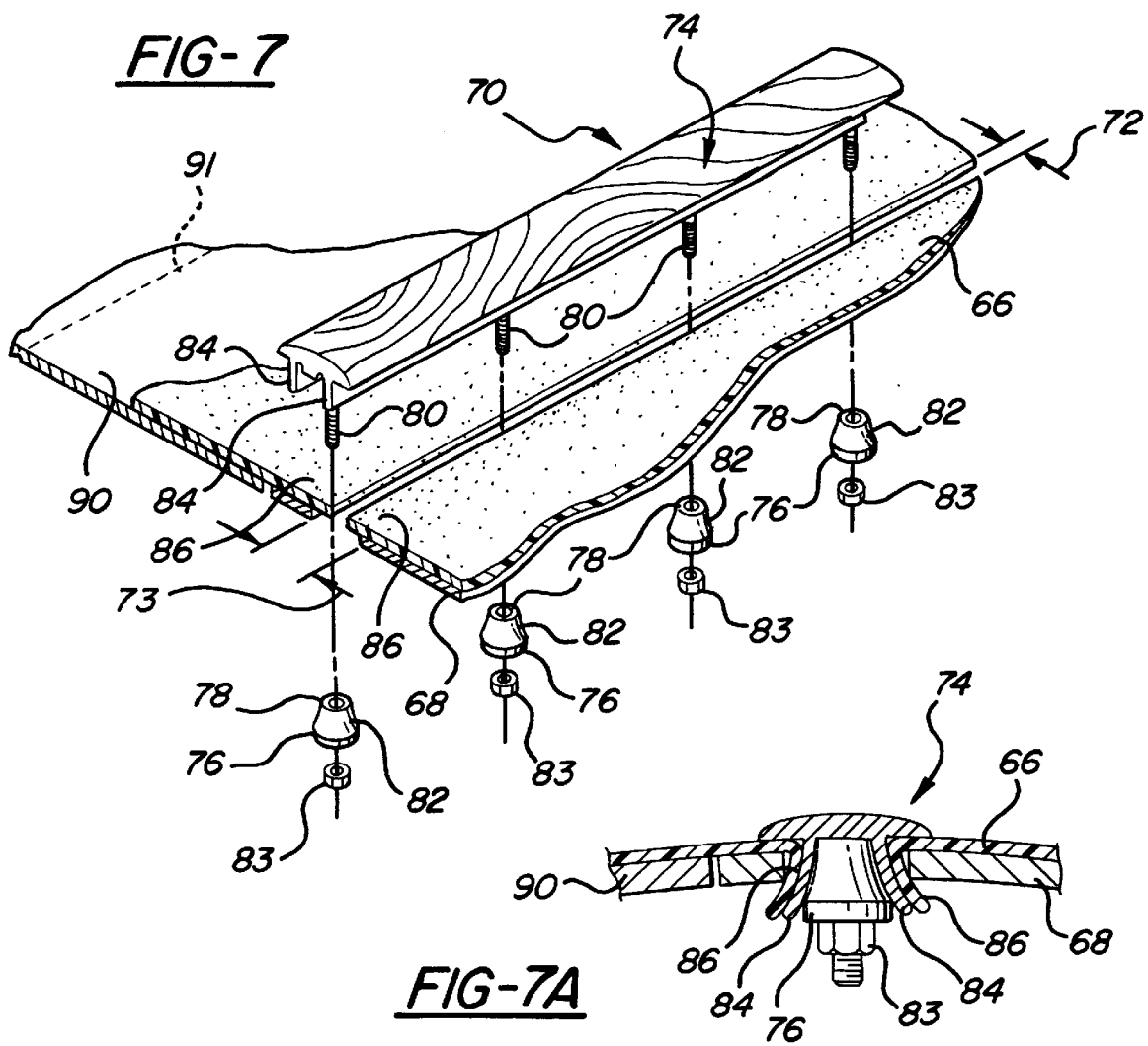
FIG-7
FIG-7A
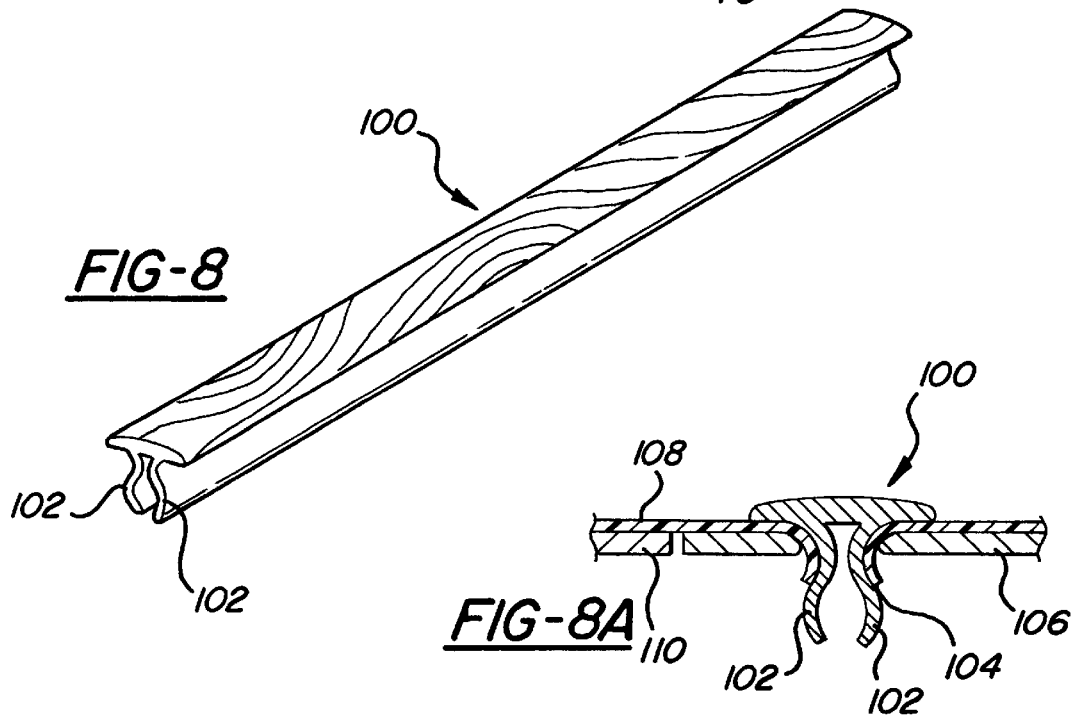
FIG-8
FIG-8A

APPLIQUE FOR CONCEALING AND RETAINING COVER TEAR SEAM FOR AIR BAG

BACKGROUND OF THE INVENTION

1. Field of the Invention

This invention relates to appliqué enhanced finishing covers for interior components of vehicles in which an air bag restraint is stored. More particularly, this invention relates to a new and improved appliqué for finishing covers having a discrete air bag door tear seam therein which is retained and hidden by the appliqué secured on the component. In this invention, the cover pulls away from the appliqué starting from the tear seam that forms a free edge of air bag door on air bag deployment.

2. Description of Related Art

Prior to the present invention various finishing covers have been provided for interior components such as instrument panels and steering wheels of automotive vehicles, which overlie air bags in their stored position. For example, in U.S. Pat. No. 5,611,564 issued Mar 18, 1997 for "Method and Treatment for Forming an Air Bag Deployment opening in Leather Covered Trim", a pretreatment for decorative leather in an automotive trim piece produces an effective pre-weakening of the leather so that it can be readily severed by the forced opening of an underlying hinged door panel from a deploying air bag.

Moreover, in U.S. Pat. No. 5,487,557 issued Jan. 30, 1996 for "Air Bag Cover Having an Applique Fastened Thereto and Method of Manufacturing Same", an automotive air bag cover is provided with an air bag tear seam and a decorative fastened thereto. The cover encloses a stored and collapsed air bag. The decorative appliqué is fastened to the front cover adjacent the tear seam therein in a non-overlapping fashion such that the decorative appliqué does not interfere with the egress of the inflating air bag from the cover.

While these and other prior disclosures provide various arrangements for covering air bags in their stored condition and allow for subsequent air bag deployment, they do not disclose or suggest any appliqué for effectively holding a finishing cover in position or releasably retaining and concealing the tear seam of the cover for augmenting air bag deployment as in the present invention.

SUMMARY OF THE INVENTION

In this invention the top cover of an interior component e.g. instrument panel, steering wheel or other interior part of a vehicle, has a discrete air bag tear seam formed therein concealed and retained by a new and improved appliqué secured to the cover. On air bag deployment, the tear seam forms a free edge of a door which is torn from the cover on air bag deployment. Prior to such deployment, the cover at the tear seam is tucked inwardly and releasable held in a concealed position by an external decorative appliqué fastened to a fixed retainer portion of the component.

More particularly, the skin material of the cover, such as vinyl, is cut along a line to form the tear seam that in the event of air bag deployment forms the bottom of the air bag door in the component. This cut line is fully covered with the new and improved appliqué that secures the skin from slippage or being pulled back prematurely during conventional vehicle use. A camming plug associated with some forms of the appliqué bows or cams laterally spaced retainer flanges thereof when the appliqué is secured to the component to releasably hold the skin material between the flanges and decorative head of the appliqué or between the flanges and a retention slot in the substrate or retainer of the interior component.

In other forms of the invention camming plugs are not used since the depending flanges of the appliqué are like leaf springs which are spring loaded when forced toward one another when inserted into the retention slot and which recover to a position whereby the skin material is releasably held by spring tension.

BRIEF DESCRIPTION OF THE DRAWINGS

FIG. 7 is a pictorial view of a portion of another instrument panel with parts in exploded position showing another embodiment of this invention;

FIG. 7A is a cross sectional view showing the appliqué of FIG. 7 in an installed position on an instrument panel;

FIG. 8 is a pictorial view of another appliqué and embodiment of this invention for installation on an instrument panel; and FIG. 8A is a cross sectional view of the appliqué of FIG. 8 as installed on an instrument panel.

DESCRIPTION OF THE PREFERRED EMBODIMENTS

Figure 1:
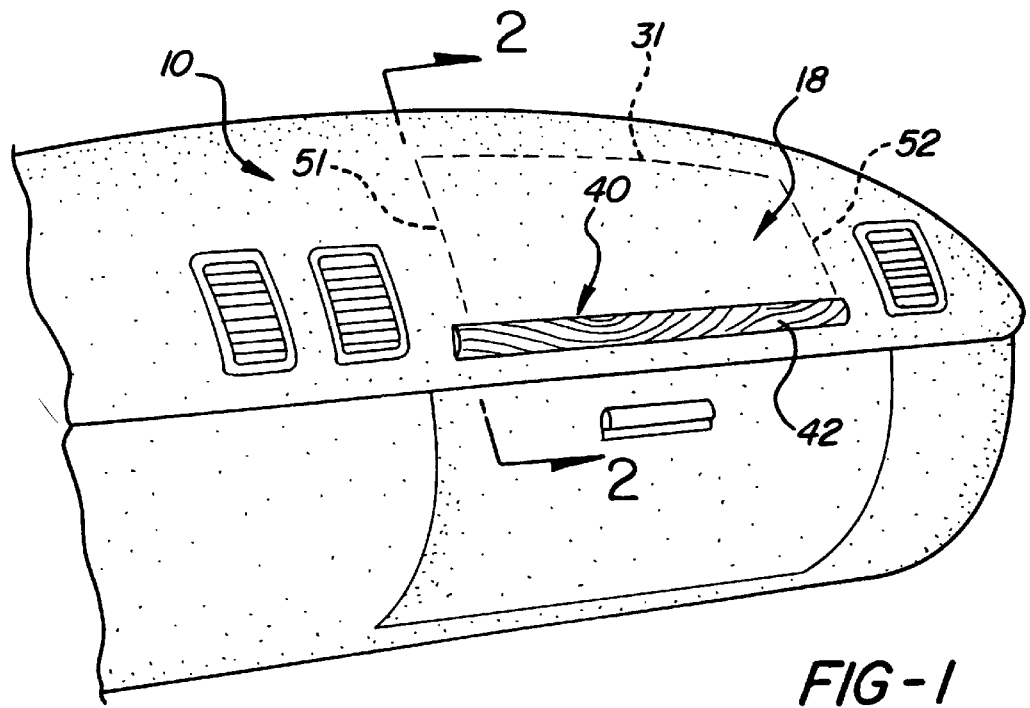
FIG. 1 is a pictorial view of a portion of an instrument panel of an automotive vehicle covered by an outer appearance cover with an appliqué secured thereto.

Turning now in greater detail to the drawings, there is shown in FIG. 1 a portion of an instrument panel 10 of an automotive vehicle. The instrument panel is conventionally located within the vehicle, forward of the occupants seated in the front seating areas thereof. Operatively mounted within the instrument panel is a supplemental inflatable restraint or air bag module 12 with an air bag 14 stored in a ready position. The bag is adapted to be inflated by operation of conventional triggering sensors, not illustrated, and inflator mechanism 16 and deployed via the opening of an air bag door 18 in the instrument panel. More particularly, the air bag 14 deploys in response to predetermined negative acceleration of the vehicle to provide restraint and protection of the passenger seated behind the air bag.

Figure 2:
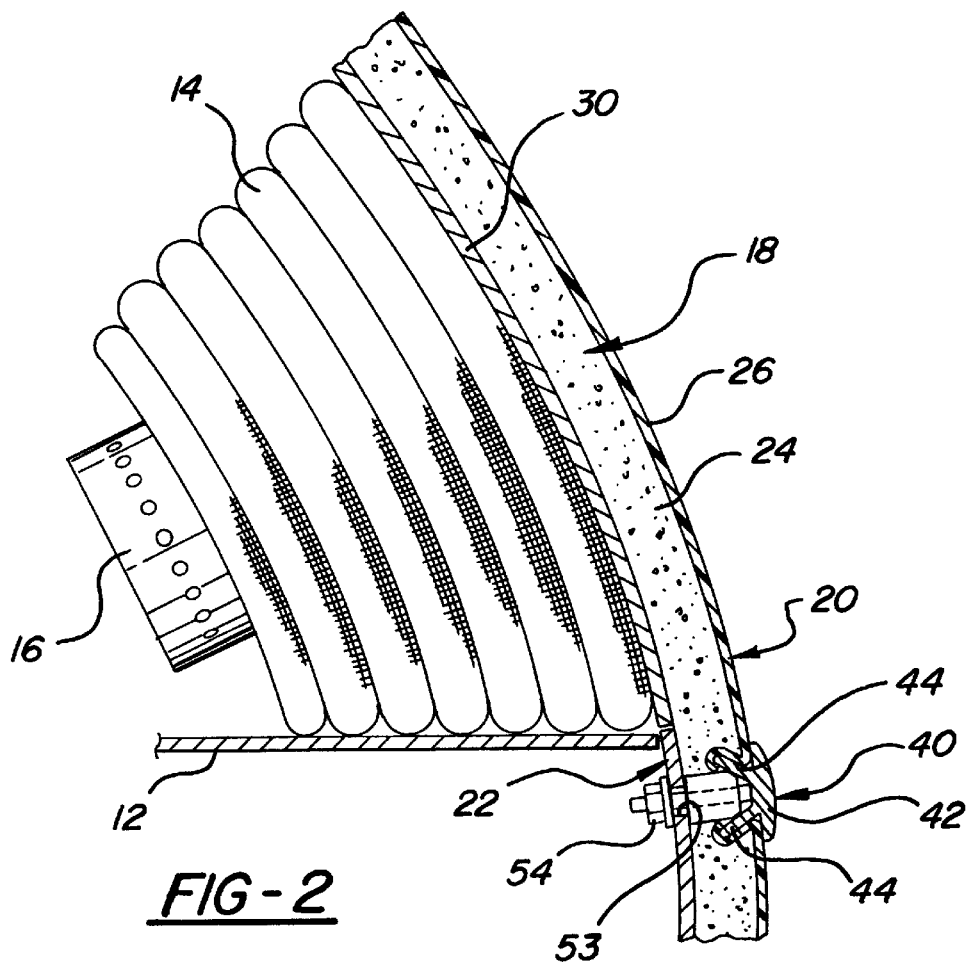
FIG. 2 is a cross sectional view of the instrument panel of FIG. 1 taken generally along sight lines 2—2 of FIG. 1.

As better shown in the cross sectional view of FIG. 2, the instrument panel 10 has a cover assembly 20 comprising a supporting substrate or retainer portion 22 which is covered by an intermediate resilient foam layer 24 of polyurethane resin, for example, and an outer flexible vinyl skin 26, for example. The substrate may be of any suitable material such as sheet metal or plastics suitably secured to structural parts of the vehicle. The foam layer is bonded or otherwise secured to the retainer portion and the flexible skin secured to the foam layer at the interface thereof. The materials and processes used to form the skin and foam layers are not intended to be limiting and may be any of those used in the art.

Figure 5:
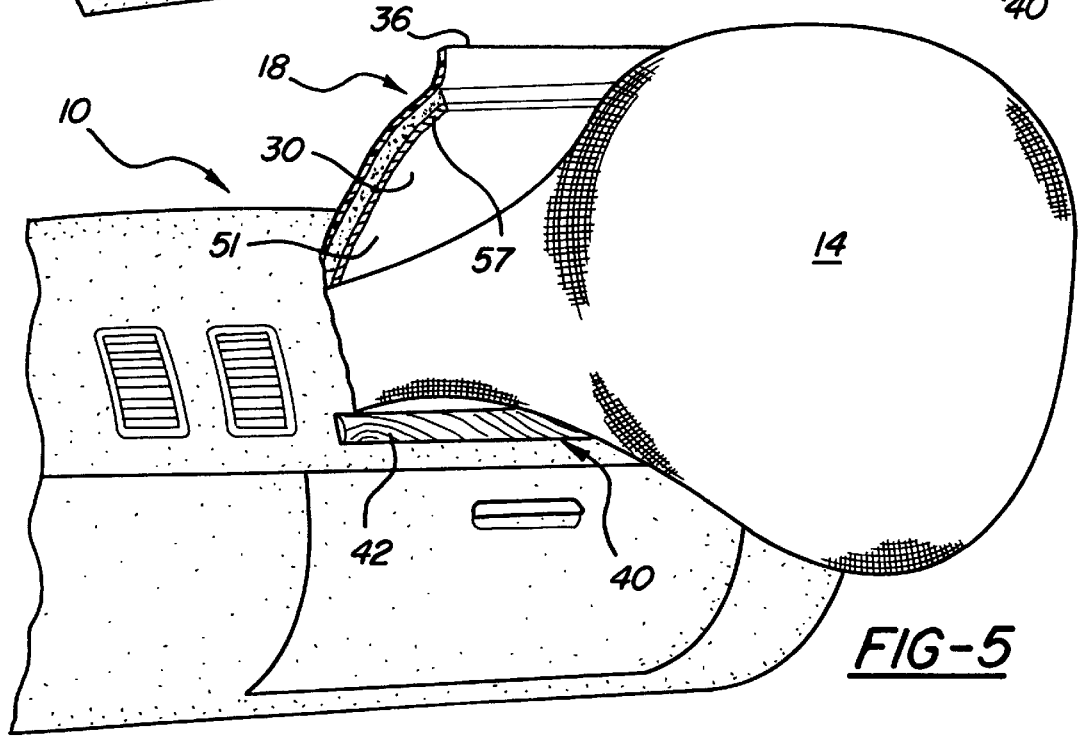
FIG. 5 is a view similar to the view of FIG. 1 illustrating the deployment of an air bag stored beneath the cover of the instrument panel.

Operatively formed in the retainer portion 22 of the panel 10 is a substrate portion 30 of the air bag door 18 operationally aligned with the air bag module and its stored air bag. The substrate portion 30 of the air bag door may be formed with three generally rectilinear sides and is designed with a laterally extending hinge 31 at the upper edge thereof. With this configuration, the door 18 can swing on the hinge from the closed position of FIG. 1 to the open position of FIG. 5 in response to deployment of the bag. The hinge 31 may be formed integrally between the retainer portion 22 of the panel 10 and substrate portion 30 of the air bag door 18 or separately attached to join the two members in any way known in the art.

Figure 3A:
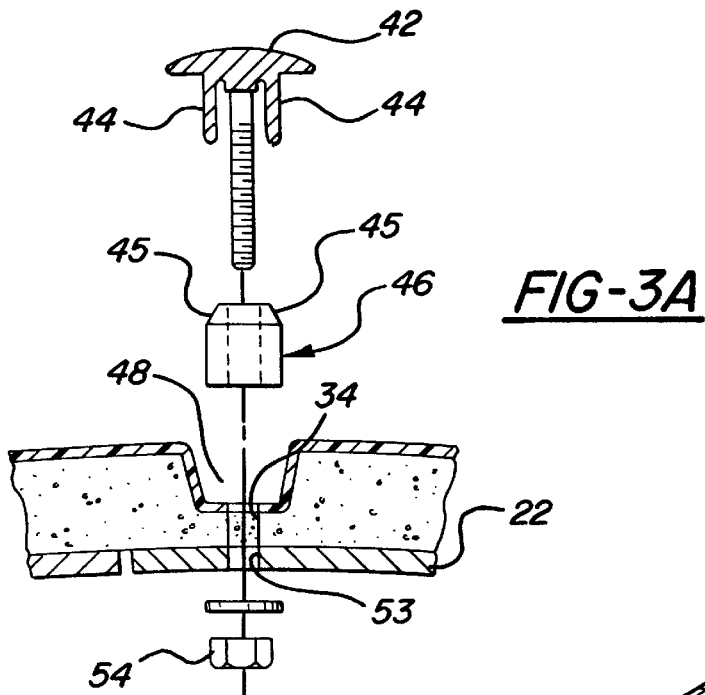
FIG. 3A is a view of a portion of the cross sectional view of FIG. 2 but showing parts thereof in exploded positions.
Figure 3B:
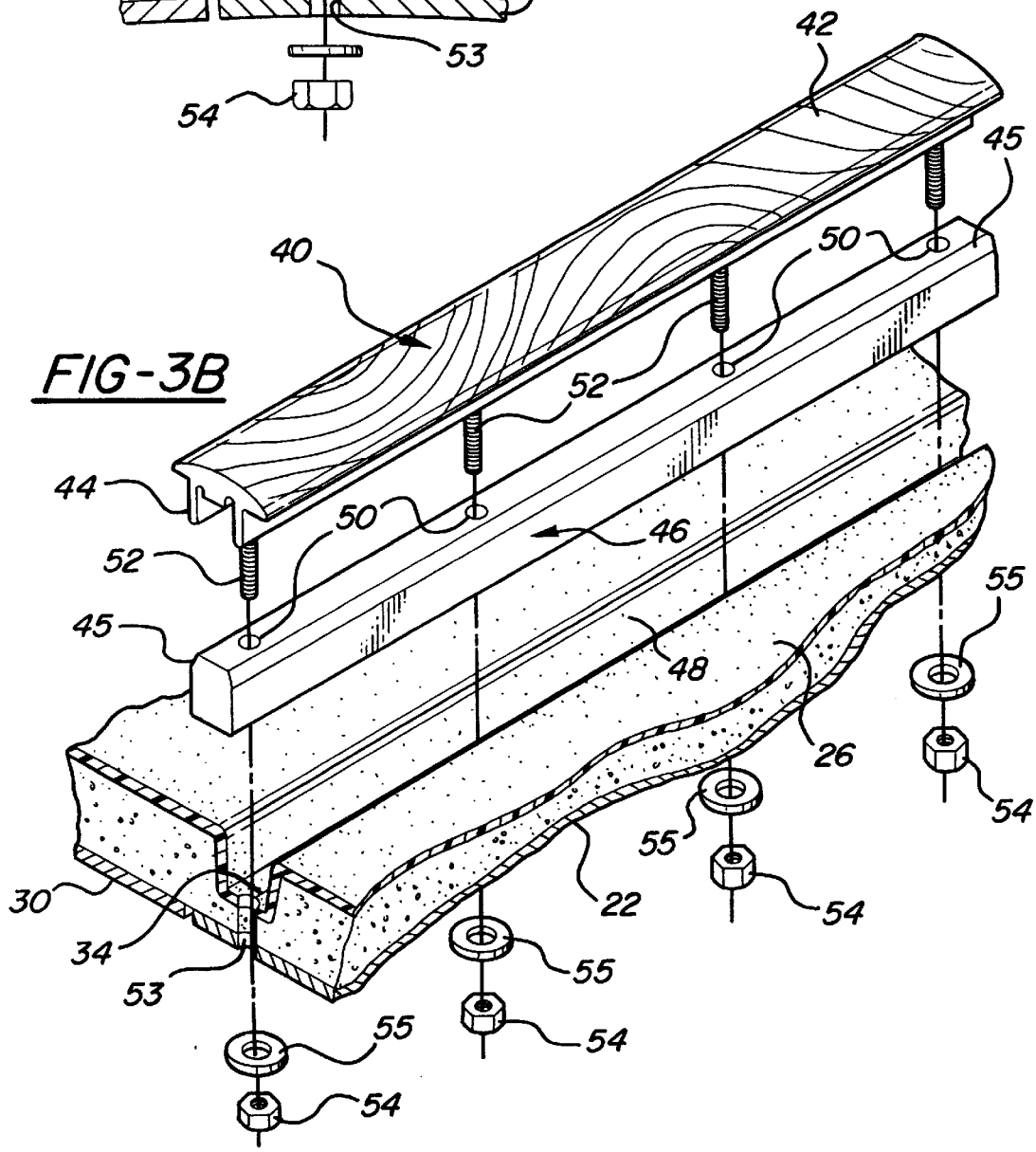
FIG. 3B is a pictorial view of a portion of the instrument panel of FIG. 1 with parts thereof in exploded positions.
Figure 4:
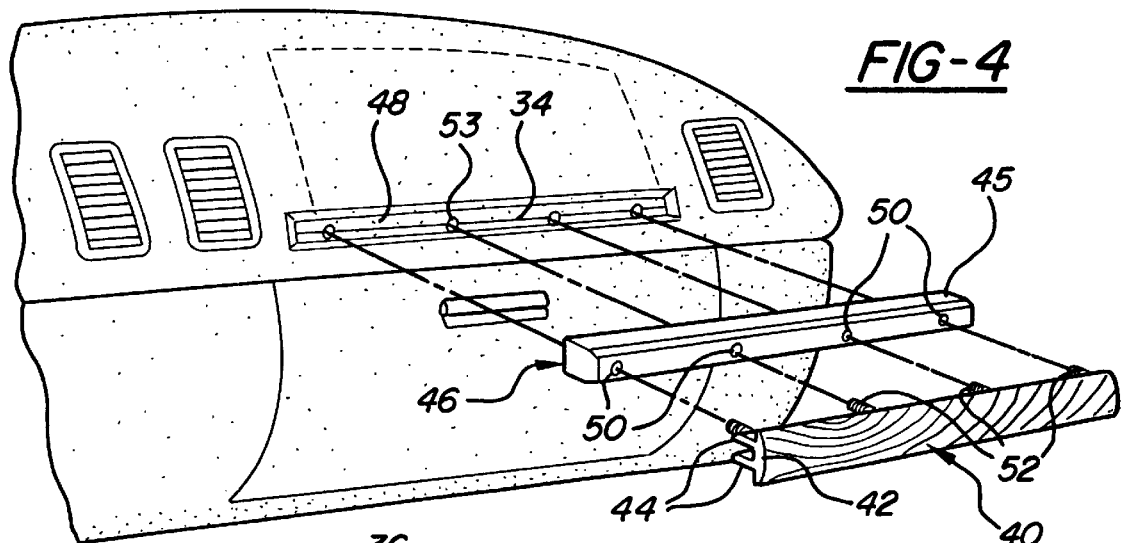
FIG. 4 is a pictorial view similar to the view of FIG. 1 but showing parts thereof in exploded position.

The skin 26 of the instrument panel is a thin flexible cover providing a finished appearance for the instrument panel 10 and the interior of the vehicle. In one preferred embodiment the skin 26 is weakened or cut along a longitudinal line (FIGS. 3A, 3B and 4) to provide a discrete tear seam 34 to form the free edge 36 of the air bag door 18 when the door is opened by the air bag. Optionally the foam layer may be weakened along a predetermined line to establish a discrete edge for the air bag door.

As shown best in FIG. 2, the outer skin 26 is retained in position by an appliqué 40 formed from a suitable plastics or metal. The appliqué comprises a laterally extending decorator head portion 42 and a pair of elongated and laterally spaced retention flanges 44 which extend in a general perpendicular direction from the head portion. These retention flanges extend into the instrument panel skin on opposite sides of (FIG. 2) or through (FIG. 7A and FIG. 8A) the tear seam and operate to firmly but releasably retain the cover and particularly the skin 26 thereof in an installed position at the tear seam. With the appliqué installed, there are no apparent pulls or wrinkles or other defects in the cover or skin thereof that might otherwise result from the provision of a tear seam.

In one preferred embodiment of the invention, the laterally spaced retention flanges 44 are cammed or spread apart by the shoulders 45 of an elongated camming plug 46 which is installed into a laterally extending groove or depression 48 formed in the cover assembly 20. This depression generally conforming to the dimensions of plug 46 can be preformed by a molding tool or other tool making the cut or tear seam 34 or by the camming plug when it is being installed on the instrument panel.

Figure 6:
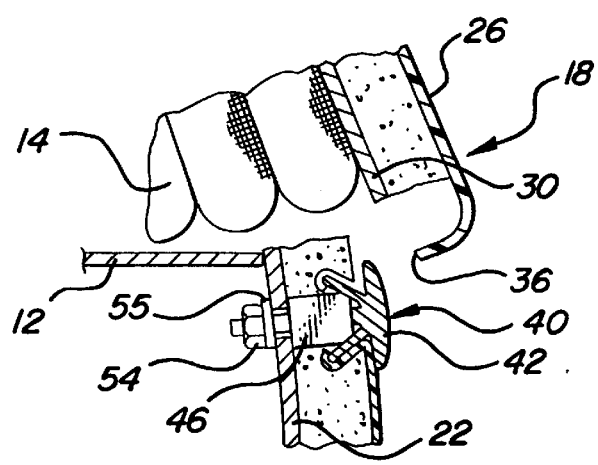
FIG. 6 is an enlarged cross sectional view of the instrument panel similar to the view of FIG. 2 but showing the air bag being deployed through the cover thereof.

The camming plug 46 has laterally spaced openings 50 therethrough which receive the threaded shanks 52 extending from the head 42 of the appliqué 40. These shanks are routed through spaced openings or a linear cut 53 formed in the substrate or retainer 22 to receive the fastener nuts 54 and washers 55 from the interior side of the instrument panel. The appliqué 40 is accordingly fastened to the fixed retainer and is a fixed member when the air bag deploys. (See FIGS. 2 and 6)

Preferably, the headed portion 42 of the appliqué 40 is installed onto the camming plug 46 and this assembly is installed in the groove or depression 48. The nuts 54 are appropriately turned on the threaded shanks to draw the decorator head portion in an installed position to fully cover the depression 48 and the tear seam 34. When the appliqué is being installed, the shoulders of the camming plug spread the retention flanges 44 outwardly and from one another. As shown in FIG. 2, this releasably traps the skin 26 at the tear seam between the spread apart flanges and the head of the appliqué.

On air bag deployment, the substrate 30 is physically contacted by the air bag and the air bag door 18 will be defined and readily swing open to an outer position. The outer skin of the door parts along a predetermined line preferably initiated from the tear seam 34. The vinyl skin further tears along side edges generally corresponding to the sides 57 of the door substrate 30. The skin of the door remains attached to the foam layer that in turn remains secured to the door substrate. The door 18 accordingly swings from the fixed appliqué to provide the passageway for improved deployment of the air bag.

As shown in the embodiment of FIGS. 7 and 7A, the skin 66, comparable to the skin of the first embodiment, is directly formed onto or otherwise secured to the retainer portion 68 of the instrument panel 70. An elongated air bag tear seam 72 is cut or otherwise made through the skin and aligned with an elongated opening 73 in the retainer portion 68 of panel 70. The appliqué 74 is substantially the same as the appliqué of the first described embodiment.

In this embodiment, a plurality of small camming plugs 76 may be employed instead of the elongated singular plug of the first embodiment. Each of these plugs 76 has an axial opening 78 therethrough for receiving the threaded shank 80 of the appliqué. The plugs are formed with tapered camming shoulders 82 which may be conical as shown When generally cylindrical camming plugs are used they may be formed with inclined rectilinear camming planes. Nuts 83 threaded on shanks 80 retain the plugs in operative position (FIG. 7A).

From an outer position the appliqué 74 may be inserted into the tear seam so that the retainer flanges 84 force the edge portions 86 of the skin defining the tear seam through the elongated opening 73 in the retainer portion 68 of the instrument panel. Subsequently, the plugs 76 are installed onto the shanks of the appliqué and advanced to a predetermined or installed position provided by advancement of nuts 83 until there is contact of the plug with the underside of the head of the appliqué. In this position the camming shoulders force the flanges of the appliqué apart so that the edges of the skin defining the tear seam are releasably retained between the flanges and the edges of the elongated opening 73 of the substrate.

On air bag deployment the substrate door 90 corresponding the door of the substrate of the previous embodiment swings open about hinge 91. The skin 66 covering the substrate door pulls away from the appliqué preferably initiated at the tear seam.

If desired, the plugs may be unitized to reduce the number of parts or the plugs may be threaded to eliminate the nut when they are separate.

In the event that a one-piece "snap-in" appliqué is desired, the appliqué 100 may be formed with laterally spaced flanges 102 which are spring-like members. As shown in FIG. 8A, these flanges can be flexed together when inserted into the tear seam and through the elongated opening 104 in the retainer 106. After installation, these spring flanges of the appliqué partially recover and apply lateral spring loads to releasably hold the edges of the skin 108 defining the tear seam in position, as illustrated.

The tear seam hidden by the fixed appliqué readily provides a free end of the air bag door on air bag deployment as set forth above in connection with the other embodiments of this invention.

While a preferred embodiment of the invention has been shown and described, other embodiments will now become apparent to those skilled in the art. Accordingly, this invention is not to be limited to that which is shown and described but by the following claims.

What is claimed is:

1. A finishing panel in an automotive vehicle for covering an air bag adapted to be deployed from a stored position to a deployed position to restrain the movement of the body of person positioned in a predetermined location relative to the panel comprising:
   a. a base having a fastening portion and an under door movably mounted relative to the base and movable from a closed position overlaying said air bag to an open position to provide a passageway for said air bag,
   b. a finishing cover for said base extending over said fastening portion and said door,
   c. an elongated air bag tear seam formed in said finishing cover,
   d. an appliqué for said finishing cover secured to said fastening portion,
   e. said appliqué having an elongated outer head portion and a pair of laterally spaced flange portions extending substantially perpendicular from said head portion,
   f. said flange portions extending into said finishing cover adjacent to said tear seam to releasably retain said finishing cover until pulled away by said air bag when deployed.

2. The finishing panel of claim 1, and further comprising a camming plug for spreading said flange portions outwardly from one another.

3. A finishing panel in an automotive vehicle for covering an air bag adapted to be deployed from a stored position to a deployed position to restrain the movement of the body of person positioned in a predetermined location relative to the panel comprising:
   a. a base having a fastening portion and an under door movably mounted relative to the base and movable from a closed position overlaying said air bag to an open position to provide a passage of said air bag,
   b. a flexible skin for said base extending over said fastening portion and said door,
   c. an elongated air bag tear seam formed in said skin,
   d. an appliqué for said skin secured to said fastening portion,
   e. said appliqué having an elongated outer head portion and a pair of laterally spaced flange portions extending substantially perpendicular from said head portion, and
   f. said flange portions extending into said tear seam and through an opening in said fastening portion to releasably retain said skin until pulled away by said air bag when deployed.

4. A cover for a component of an automotive vehicle disposed over a vehicle occupant restraint unit including an inflatable air bag operatively mounted in the vehicle comprising a retainer plate having a plurality of fastener openings, a passage in said retainer plate for allowing said air bag to be deployed through said retainer plate, a flexible skin covering said retainer plate and the air bag passage therein, an elongated air bag tear seam formed in said flexible skin to provide at least one side of said passage, an appliqué for covering said tear seam adapted to be secured to said retainer plate, said appliqué having a plurality of fastener shanks extending through said tear seam and through said fastener openings formed in said retainer plate, said appliqué further having substantially perpendicular extending flange portions and means to effect defection thereof to releasably retain said skin so that said bag can tear a doorway through said skin with the tear seam forming at least one edge thereof.

5. A cover for an instrument panel of an automotive vehicle disposed over a vehicle occupant restraint unit incorporating an inflatable air bag operatively mounted for deployment in the vehicle comprising a retainer plate, an air bag passage in said retainer plate operatively allowing air bag deployment therethrough, a flexible skin covering said retainer plate and the air bag passage therein, an elongated air bag tear seam formed in said flexible skin forming at least one side of said air bag passage, an appliqué for covering said tear seam adapted to be secured to said retainer plate, said appliqué having substantially perpendicular, laterally-spaced and resilient retention flanges to releasably secure said appliqué to said retainer plate and said skin to said appliqué so that said air bag can tear a doorway through said skin with the tear seam forming at least one edge thereof.

* * * * *